(12) United States Patent
Hamada et al.

(10) Patent No.: US 6,733,918 B2
(45) Date of Patent: May 11, 2004

(54) SEALED RECHARGEABLE BATTERY

(75) Inventors: Shinji Hamada, Toyohashi (JP); Toyohiko Eto, Toyota (JP)

(73) Assignees: Matsushita Electric Industrial Co., Ltd., Kadoma (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/422,506

(22) Filed: Apr. 24, 2003

(65) Prior Publication Data
US 2003/0203280 A1 Oct. 30, 2003

(30) Foreign Application Priority Data

Apr. 24, 2002 (JP) ......................................... 2002-121571

(51) Int. Cl.[7] .......................... H01M 2/02; H01M 10/36
(52) U.S. Cl. ........................... 429/94; 429/57; 429/176; 429/185
(58) Field of Search .............................. 429/94, 211, 57, 429/185, 175, 176

(56) References Cited

U.S. PATENT DOCUMENTS 3,761,314 A * 9/1973 Cailley ........................ 429/94
4,767,682 A * 8/1988 Dorogi et al. ................ 429/94

FOREIGN PATENT DOCUMENTS

| JP | 2692533 | 1/1995 |
| JP | 2697565 | 2/1995 |
| JP | 2000-243433 | 9/2000 |

* cited by examiner

Primary Examiner—John S. Maples
(74) Attorney, Agent, or Firm—Jordan and Hamburg LLP

(57) ABSTRACT

An electrode plate group is accommodated together with liquid electrolyte in a metal case having an oval or rectangular cross section. The open end of the case is sealed by a metal sealing plate, with an insulation gasket fitted between the case and the sealing plate. The electrode plate group is constructed with a positive electrode plate and a negative electrode plate wound around with a separator interposed therebetween. Core materials of respective plates are protruded to opposite sides to form a positive electrode end face and a negative electrode end face at either end of the electrode plate group. The winding axis of the electrode plates is vertical to the open end of the case, and the positive and negative electrode end faces are respectively connected to the sealing plate and the bottom face of the case in direct or indirect surface contact therewith.

14 Claims, 5 Drawing Sheets

SEALED RECHARGEABLE BATTERY

The present disclosure relates to subject matter contained in priority Japanese Patent Application No. 2002-121571, filed on Apr. 24, 2002, the contents of which is herein expressly incorporated by reference in its entirety.

BACKGROUND OF THE INVENTION

1. Field of the Invention

The present invention relates to a sealed rechargeable battery. More particularly, it relates to a battery having an electrode plate group constructed with a positive electrode plate and a negative electrode plate wound around with a separator interposed therebetween and accommodated in a case having an oval or rectangular cross section.

2. Description of Related Art

Demands have been growing for electric vehicles or gasoline-electric hybrid vehicles in light of global environmental issues. Rechargeable batteries used as power sources for such vehicles are required to be small and lightweight as well as to have high capacity and high power output. Lithium ion rechargeable batteries and nickel metal hydride batteries are known to satisfy these requirements and have actually found practical applications.

FIG. 6 shows one such conventional sealed rechargeable battery. It accommodates an electrode plate group 24 in a cylindrical metal case 25 together with liquid electrolyte. The electrode plate group 24 consists of a strip of positive electrode plate 21 and a strip of negative electrode plate 22 wound around with a separator 23 interposed therebetween. Positive and negative electrode tabs 26 and 27 are extended from given locations of the positive electrode plate 21 and negative electrode plate 22 in opposite directions. The negative electrode tab 27 extended to the lower side is welded to a bottom face of the case 25, and the positive electrode tab 26 extended to the upper side is welded to a sealing plate 28 for sealing the open end of the case 25. The sealing plate 28 is fixed to the case 25 with a gasket 29 fitted therebetween to provide a seal.

In the construction shown in FIG. 6, because the positive electrode plate 21 is connected to the sealing plate 28 via the positive electrode tab 26 and the negative electrode plate 22 is connected to the case 25 via the negative electrode tab 27, the connection resistance is large. The battery internal resistance is accordingly large, because of which the output characteristics and large current discharge characteristics are not satisfactory. There is also the problem of high costs because of large numbers of components and assembling steps.

Japanese Patent Laid-Open Publication No. 2000-243433 discloses a construction for a rechargeable battery, which is shown in FIG. 7A. A positive electrode plate 31 and a negative electrode plate 32 are wound around with a separator 33 interposed therebetween to form an electrode plate group 34 such that one lateral edge of the positive electrode plate 31 and one lateral edge of the negative electrode plate 32 are respectively protruded. These projecting portions 31a and 32a of the positive and negative electrode plates are directly bonded to a sealing plate 36 and the bottom face of a case 35, respectively, by laser beam welding. To achieve high bonding strength in the welding between the positive electrode projecting portion 31a and the sealing plate 36 and between the negative electrode projecting portion 32a and the bottom face of the case 35, radial ribs 37 are provided on the sealing plate 36 or on the bottom face of the case 35 so as to form protruding bonding surfaces as shown in FIGS. 7B and 7C.

The battery shown in FIGS. 7A to 7C, however, has the following problems: When constructing a battery pack by connecting a plurality of such batteries as battery modules, the number of the batteries that can be accommodated in a confined space is limited because they are cylindrical. The volume efficiency will be further reduced if cooling passages are to be formed between the batteries to prevent battery temperature rise. Each battery will exhibit poor cooling properties particularly in the central portion because its cross section is circular. That is, this battery has poor volume efficiency per power output.

Another problem is that, because the electrode plate group 34 is welded to the case 35 and the sealing plate 36 at the radial ribs 37 as shown in FIG. 7B and FIG. 7C, welds are gathered in high density in the central portion of the electrode plate group 34 while the welds are sparse in the outer peripheral portion. This makes the current distribution in the positive and negative electrode plates 31 and 32 uneven, which increases battery internal resistance and makes the chemical reactions of active materials uneven. The output characteristics and large current discharge characteristics are thereby reduced, adversely affecting the battery life.

Japanese Patents Nos. 2692533 and 2697565 show a construction for a sealed prismatic rechargeable battery, in which an electrode plate group formed by winding around a positive electrode plate and a negative electrode plate with a separator therebetween is accommodated in a prismatic case such that its winding axis is in parallel to the open end of the case. The open end of the case is sealed by a lid provided with a positive terminal, to which one end of the positive electrode plate is connected. The negative electrode plate which is located at the outermost side of the electrode plate group is connected to the case. With this construction, because one end of the positive and negative electrode plates is connected to the positive terminal and the case which forms the opposite terminal, the current path from each electrode plate is relatively long, so that the battery internal resistance is large because of the large current resistance inside the battery, and therefore the output characteristics and large current discharge characteristics are not satisfactory. Moreover, while a cylindrical battery can retain its electrode plate group securely in position within the case, the prismatic battery cannot hold its rolled electrode plate group securely inside the rectangular tube case. Thus, there is a risk that active material mixtures may come off the positive or negative electrode plates when vibration is applied to the battery, whereupon the battery characteristics are suddenly deteriorated because of the damaged electrode plate group.

SUMMARY OF THE INVENTION

In light of the problems of the conventional batteries, an object of the present invention is to provide a sealed rechargeable battery having high volume efficiency per power output and favorable output characteristics and large current discharge characteristics.

The present invention provides a sealed rechargeable battery including: a metal case having any of an oval cross section and a rectangular cross section; a metal sealing plate for sealing an open end of the case; an insulation gasket interposed between the case and the sealing plate; and an electrode plate group including a positive electrode plate and a negative electrode plate wound around with a separator interposed therebetween. Core materials of the positive electrode plate and the negative electrode plate are protruded to opposite sides to form a positive electrode end face and a negative electrode end face at either end of the electrode plate group. The electrode plate group is accommodated in the case with liquid electrolyte with its winding axis vertical relative to the open end of the case. The positive electrode end face is connected to either one of a bottom face of the case and the sealing plate in direct surface contact therewith or indirectly coupled thereto, and the negative electrode end face is connected to the other one of the bottom face of the case and the sealing plate in direct surface contact therewith or indirectly coupled thereto.

With this construction, because the battery case has an oval or rectangular cross section, its volume efficiency per power output is higher than that of a cylindrical battery. A plurality of such batteries can be arranged in a limited space with good space efficiency particularly when constituting a battery pack with cooling passages between adjacent batteries. The resultant battery pack will thus have a small volume per power output. The battery exhibits high cooling properties relative to the entire cross section because of the flat outer shape, and its metal case has better cooling properties than a resin case, whereby temperature rise of the battery is effectively prevented and the battery output characteristics and service life are improved. Furthermore, because both end faces of the electrode plate group are respectively connected to the bottom face of the case and the sealing plate in a state wherein they make direct surface contact with each other or indirect connection therebetween, the current path between any given point in the electrode plates and the case or sealing plate which will form external connection terminals is made short, and also the current distribution in each electrode plate is made uniform, whereby the active materials on the electrode plates are entirely and uniformly contributed to the reactions. Internal resistance is thus reduced, high output characteristics and large current discharge characteristics are achieved, and battery life is made longer. Also, since both end faces of the electrode plate group are held entirely by the bottom face of the case and sealing plate, the electrode plate group is securely retained even when vibration is applied. Therefore there is no risk that battery characteristics are suddenly deteriorated resulting from damages to the electrode plate group because of active material mixtures coming off the electrode plates. Moreover, because the metal case does not necessitate any treatment for preventing gas permeation as with a resin case, the battery is fabricated with fewer process steps and at lower cost.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF PREFERRED EMBODIMENTS

Figure 1A:
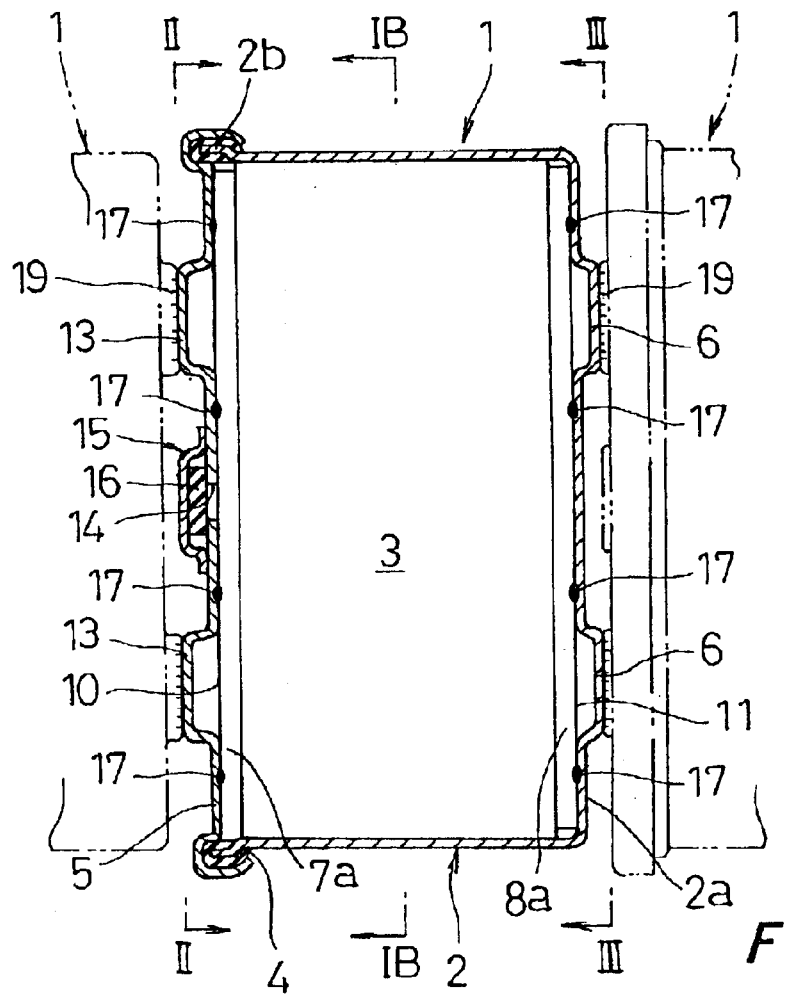
FIGS. 1A to 1C illustrate a sealed rechargeable battery according to one embodiment of the present invention, FIG. 1A being a longitudinal sectional front view, FIG. 1B being a cross section taken in the direction of arrows IB—IB of FIG. 1A, and FIG. 1C being an enlarged detailed view of the part IC of FIG. 1B.
Figure 1B:
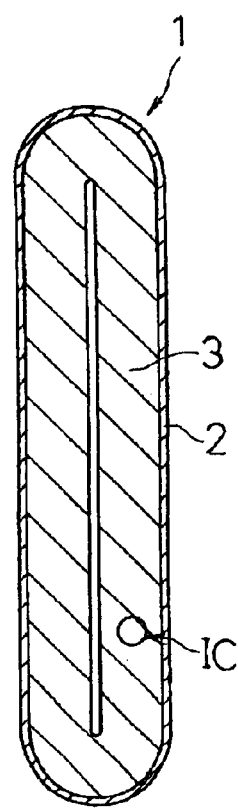
Figure 1C:
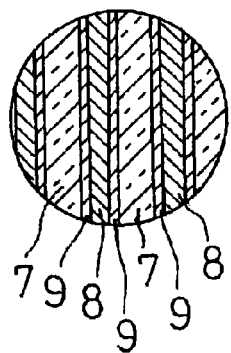

One embodiment of a sealed rechargeable battery according to the present invention will be hereinafter described with reference to FIG. 1A to FIG. 4.

As shown in FIG. 1A to FIG. 3, a sealed rechargeable battery 1 is constructed such that an electrode plate group 3 is accommodated in a metal case 2 having an oval cross section together with liquid electrolyte, and the open end of the case 2 is sealed by a metal sealing plate 5, with an insulation gasket 4 fitted therebetween. The case 2 is illustrated as having an oval cross section as one example, but it may have a rounded rectangular or a rectangular cross section.

In a central portion on the bottom face 2a of the case 2 is protruded a pair of rectangular connection bosses 6 with a suitable spacing. The connection boss 6 may only be provided at one location in the center, or at more than two locations with a suitable spacing. At the open end of the case 2 is formed a step and an enlarged open edge 2b, which enhances the case rigidity and improves workability in encasing electrode plate groups 3, and which also secures installation space for the gasket 4.

The electrode plate group 3 is constructed with a positive electrode plate 7 and a negative electrode plate 8 superposed with a separator 9 interposed therebetween. The electrode plates are wound around a plate-like core in a state wherein their respective core materials 7a and 8a are laterally protruded in opposite directions. The winding core is removed thereafter and the electrode plates are compressed. The protruding lateral edges of the respective core materials 7a and 8a form an oval positive electrode end face 10 and a negative electrode end face 11 at either end of the electrode plate group 3. Sheet-like nickel solder pieces may be attached to these positive and negative electrode end faces 10 and 11 as required. Depending on cases, collector plates (not shown) may be bonded to the end faces by laser beam welding or electron beam welding, and nickel solder pieces may be attached on the outer face of these collector plates.

The outer peripheral edge of the sealing plate 5 is formed as an annular coupling portion 12 having a substantially U-shaped cross section, which will engage with the enlarged open edge 2b of the case 2 with the gasket 4 fitted therebetween. Connection bosses 13 are protruded on the sealing plate 5 at locations opposite the connection bosses 6 on the bottom face 2a of the case 2. In a central portion is formed a hole 14 for injecting liquid electrolyte; a safety vent assembly 15 including a rubber vent 16 for sealing the hole 14 is fitted onto the hole 14 after the injection of the liquid electrolyte.

Figure 2:
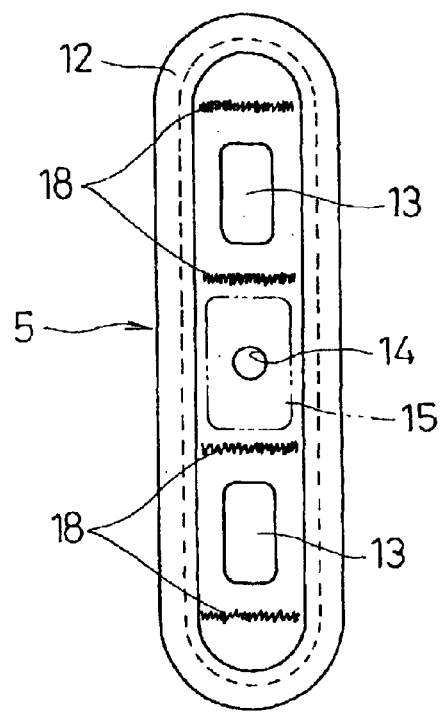
FIG. 2 is a side view taken in the direction of arrows II—II of FIG. 1A.
Figure 3:
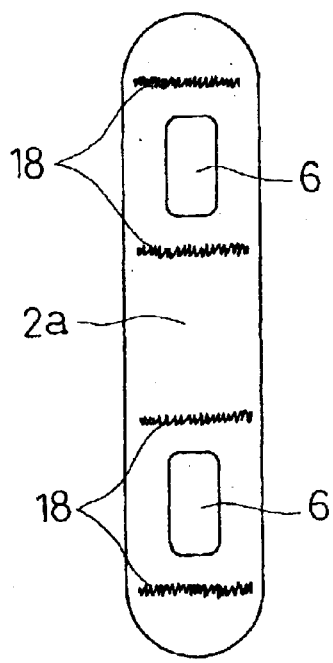
FIG. 3 is a side view taken in the direction of arrows III—III of FIG. 1A.
Figure 4:
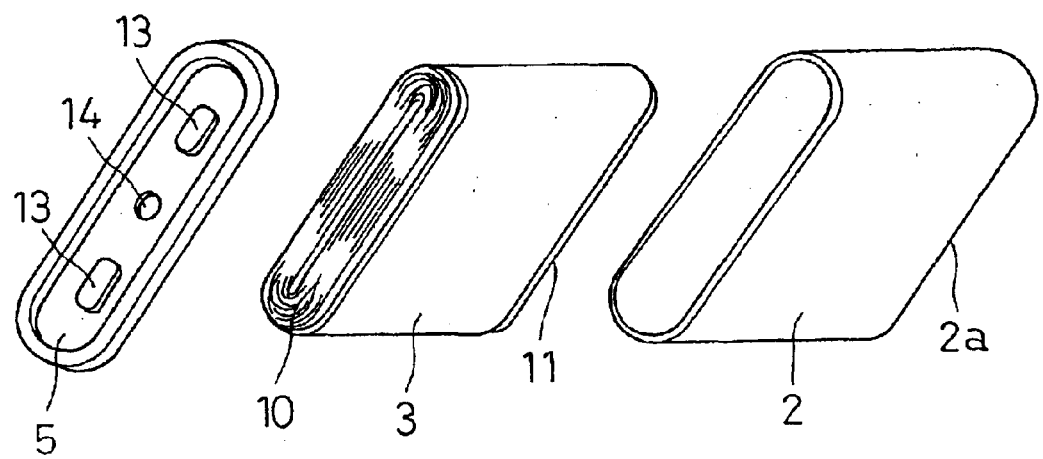
FIG. 4 is an exploded perspective view of this sealed rechargeable battery.

The positive electrode end face 10 and the negative electrode end face 11 of the electrode plate group 3 are respectively welded to the sealing plate 5 and to the bottom face 2a of the case 2 at weld points 17 by laser beam welding or electron beam welding. The weld points 17 form four weld lines 18 across the longer sides of the oval shape as shown in FIG. 2 and FIG. 3, each two lines being located on either side of each projection boss 6, 13.

In a manufacturing process of the sealed rechargeable battery 1 constructed as described above, the electrode plate group 3 is set inside the case 2 such that the negative electrode end face 11 is on the side of the bottom face 2a of the case 2 and the positive electrode end face 10 is on the open end side. The gasket 4 is fitted to the open end of the case 2, and the sealing plate 5 is coupled thereonto. The peripheral edge of the annular coupling portion 12 of the sealing plate 5 is crimped inwards to seal the opening. Then, either a laser beam or electron beam is irradiated along the weld lines 18 as shown in FIG. 2 and FIG. 3 from outside to the bottom face 2a of the case 2 and the sealing plate 5, whereby the positive and negative electrode end faces 10 and 11 are welded to the sealing plate 5 and the bottom face 2a of the case 2 respectively at the weld points 17. Thereafter, liquid electrolyte is injected through the hole 14, and the safety vent assembly 15 is fitted to finish the battery 1.

When constructing a battery pack by connecting a plurality of such sealed rechargeable batteries 1 in series, the connection bosses 6 on the bottom face 2a of the case 2 are abutted to the connection bosses 13 on the sealing plate 5 of adjoining batteries as indicated by imaginary lines in FIG. 1A, and a laser beam or electron beam is irradiated to the interface of the abutted tips of the connection bosses 6 and 13 through the gaps between the bottom face 2a and the sealing plate 5, whereby they are mechanically and electrically joined together at weld points 19.

According to the sealed rechargeable battery 1 of the invention, because it has an oval or rectangular cross section, it is arranged in a limited space with good space efficiency particularly when constituting a battery pack with cooling passages between each adjacent batteries 1, 1. The resultant battery pack will thus have a small volume per power output.

Because the sealed rechargeable battery 1 has a flat outer shape, it exhibits high cooling properties relative to the entire cross section of the battery. Also, because its metal case has better cooling properties than a resin case, it effectively prevents battery temperature rise, whereby the battery output characteristics and service life are improved. Since no treatment for preventing gas permeation is necessary as with a resin case, the battery is fabricated with fewer process steps and at lower cost.

Furthermore, because the positive and negative electrode end faces 10 and 11 at either end of the electrode plate group 3 are respectively connected to the bottom face 2a of the case 2 and the sealing plate 5 in surface contact therewith, the current path between any given point in the positive and negative electrode plates 7 and 8 and the case 2 and the sealing plate 5 which will form external connection terminals is made short, and also the current distribution in each electrode plate is made uniform, whereby the active materials on the electrode plates are entirely and uniformly contributed to the reactions, thereby reducing internal resistance. High output characteristics and large current discharge characteristics are thereby achieved, and battery life is made longer.

Because the positive and negative electrode end faces 10 and 11 are respectively welded to the sealing plate 5 and the bottom face 2a of the case 2 directly at weld points 17, the number of components is reduced and fabrication cost is made lower. Since the weld points 17 are located such as to form a plurality of weld lines 18 crossing the longer sides of the oval cross section of the battery, the welding operation is carried out with good workability. Also, because the positive and negative electrode plates 7 and 8, which are strip-like, are connected at weld points at regularly spaced locations along their length, the current distribution in each electrode plate 7, 8 is made uniform, whereby current resistance is reduced, the reactions of active materials are made uniform, and battery life is made longer.

Since both ends of the electrode plate group 3 are held entirely by the bottom face 2a of the case 2 and the sealing plate 5, the electrode plate group 3 is securely retained even when vibration is applied. Thus, there is no risk that battery characteristics are suddenly deteriorated because of active material mixtures coming off the electrode plates.

The bottom face 2a of the case 2 and the sealing plate 5 are respectively formed with a plurality of connection bosses 6 and 13 at opposite locations protruding from their outermost surfaces. When constructing a battery pack by connecting a plurality of batteries in series, these connection bosses 6 and 13 are abutted and welded together by irradiating a laser beam or electron beam to the lateral portion of the connection bosses 6 and 13 through the gaps between adjacent batteries 1, 1. Highly reliable welds are thereby formed with good workability. Battery packs are thus manufactured with good productivity. Because the connection between two batteries is achieved by welding the connection bosses from outside, thermal effects on battery's internal components are negligible.

Figure 5:
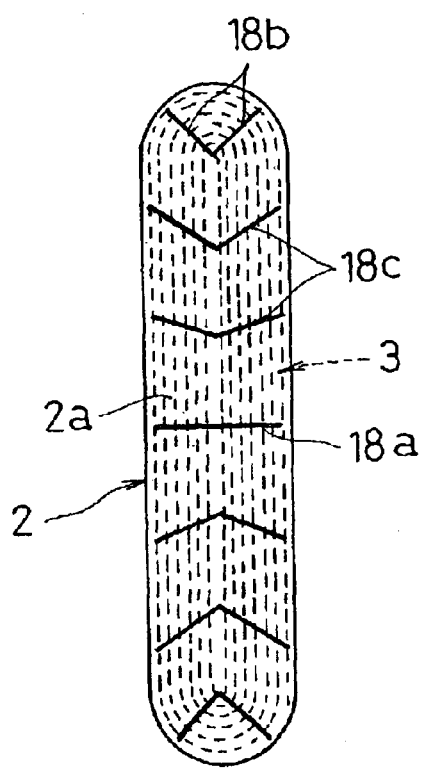
FIG. 5 is a diagram for showing locations of weld points between the electrode plate group and the bottom face of the case or the sealing plate of this battery.
Figure 6:
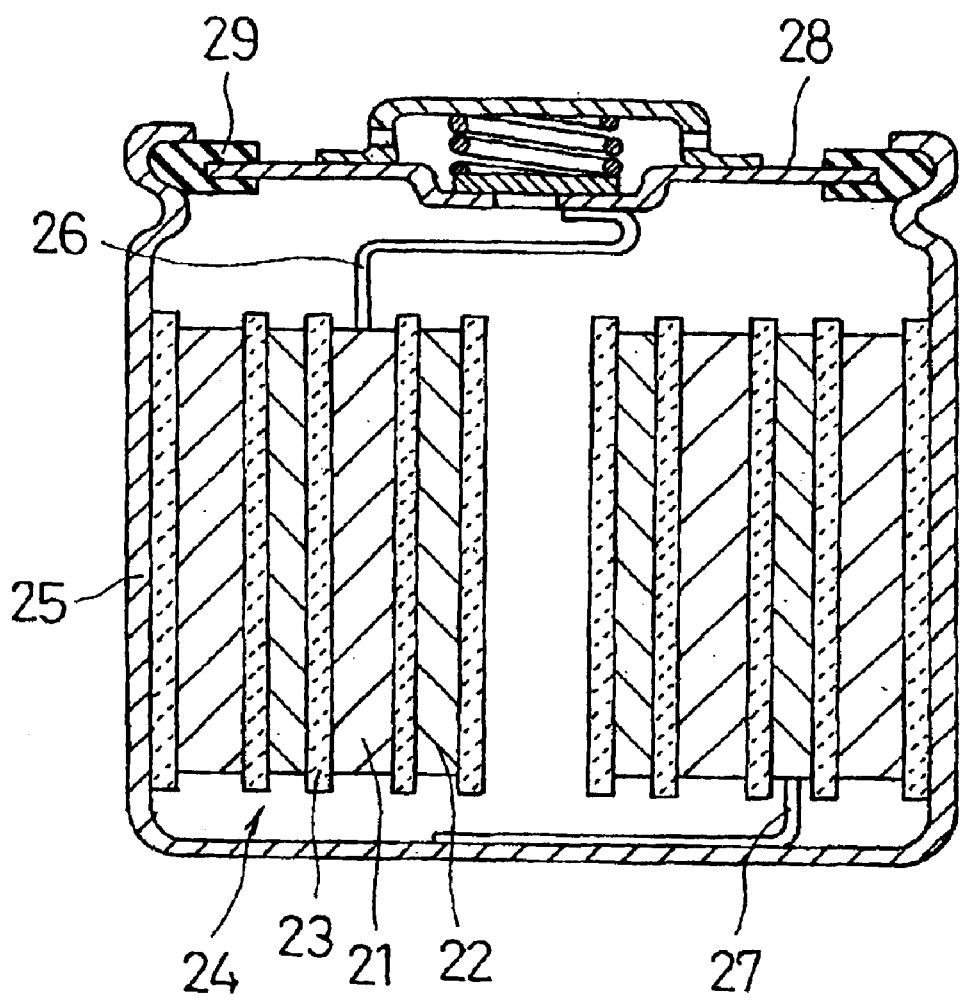
FIG. 6 is a longitudinal sectional view of a conventional sealed rechargeable battery.
Figure 7A:
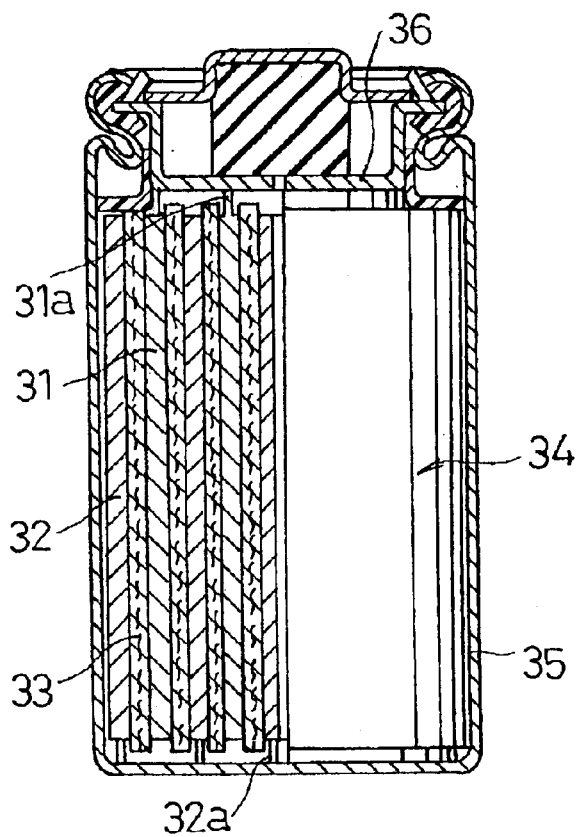
FIG. 7A is a longitudinal sectional view of another conventional sealed rechargeable battery.
Figure 7B:
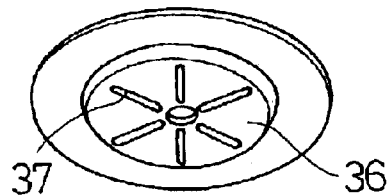
FIG. 7B is a perspective view of its sealing plate.
Figure 7C:
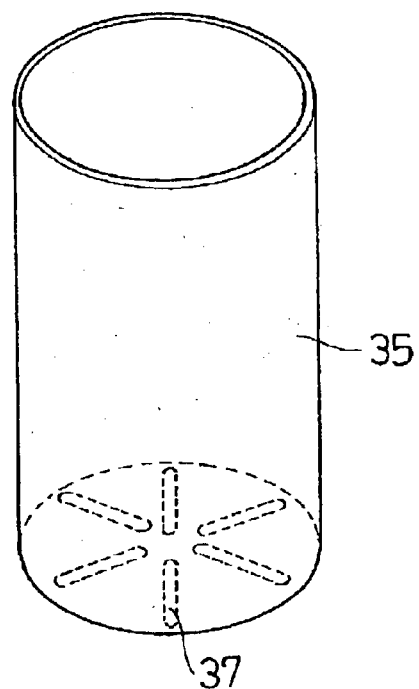
FIG. 7C is a perspective view of its case.

In the embodiment described above, the positive and negative electrode end faces 10 and 11 are respectively welded to the sealing plate 5 and the bottom face 2a of the case 2 along the weld lines 18 that extend orthogonally to the lengthwise direction of the oval on both sides of the connection bosses 6 and 13. FIG. 5 shows another possible layout of weld lines: a weld line 18a in the center in the lengthwise direction of the oval is a straight line orthogonal to the lengthwise direction; weld lines 18b in the semicircular portions at either end of the oval are one or more lines along the radius; and weld lines 18c in between them are flat V-shaped lines at substantially equally spaced locations.

The welding operation can be performed with good workability with such layout of weld lines 18a to 18c. Also, because the strip-like positive and negative electrode plates 7 and 8 are connected at regularly spaced locations along their entire length, the current distribution in each electrode plate 7, 8 is made uniform, whereby current resistance is reduced, the reactions of active materials are made uniform, and battery life is made longer.

In the embodiment described above, the connection bosses 6 and 13 are protruded on both of the bottom face 2a of the case 2 and the sealing plate 5 so that they face each other when two batteries are arranged in series, but they may be provided only to one of the bottom face 2 and the sealing plate 5.

According to the sealed rechargeable battery of the present invention, it is arranged in a limited space with good space efficiency particularly when constituting a battery pack with cooling passages. The resultant battery pack will thus have a small volume per power output. It exhibits high cooling properties relative to the entire cross section because of the flat outer shape, and its metal case has better cooling properties than a resin case, whereby the battery output characteristics and service life are improved. Furthermore, because both end faces of the electrode plate group are respectively connected to the bottom face of the case and the sealing plate in direct surface contact therewith or indirectly coupled thereto, the current path between any given point in the electrode plates and the case or sealing plate is made short, and also the current distribution in each electrode plate is made uniform, whereby the active materials on the electrode plates are entirely and uniformly contributed to the reactions, thereby reducing internal resistance. Also, since both end faces of the electrode plate group are held entirely by the bottom face of the case and the sealing plate, the electrode plate group is securely retained even when vibration is applied. Therefore there is no risk that battery characteristics are suddenly deteriorated.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed rechargeable battery comprising:
    a metal case having any of an oval cross section and a rectangular cross section;
    a metal sealing plate for sealing an open end of the case;
    an insulation gasket interposed between the case and the sealing plate; and
    an electrode plate group comprising a positive electrode plate and a negative electrode plate wound around with a separator interposed therebetween, core materials of the positive electrode plate and the negative electrode plate being protruded to opposite sides to form a positive electrode end face and a negative electrode end face at either end of the electrode plate group,
    the electrode plate group being accommodated in the case with liquid electrolyte with its winding axis vertical relative to the open end of the case, and
    the positive electrode end face being directly connected by welding to one of a bottom face of the case and the sealing plate and the negative electrode end face being directly connected by welding to the other one of the bottom face of the case and the sealing plate, the bottom face of the case and the sealing plate each including a plurality of weld lines at regularly spaced locations along their length to provide a uniform current distribution in each of the positive electrode plate and the negative electrode plate.

2. The sealed rechargeable battery according to claim 1, wherein the electrode plate group has an oval cross section, and the positive electrode end face and the negative electrode end face are welded along the plurality of weld lines extending orthogonal to a lengthwise direction of the oval.

3. The sealed rechargeable battery according to claim 2, wherein the plurality of weld lines comprise a straight line located in a central portion of the oval orthogonal to the lengthwise direction of the oval, one or more lines located at semi-circular portions at either end of the oval and extended radially, and a plurality of flat V-shaped lines in between the central portion and either end of the oval at substantially equally spaced locations.

4. The sealed rechargeable battery according to claim 1, further comprising one or more connection bosses on at least one of the bottom face of the case and the sealing plate such as to protrude from an outermost surface thereof.

5. The sealed rechargeable battery according to claim 4, wherein the connection bosses are formed on both of the bottom face of the case and the sealing plate at opposite locations.

6. The sealed rechargeable battery according to claim 1, further comprising two connection bosses on the bottom face of the case and two connection bosses on the sealing plate, the weld lines on the bottom face comprising four weld lines, one on each side of each of the connection bosses, the weld lines on the sealing plate comprising four weld lines, one on each side of and adjacent each of the connection bosses.

7. The sealed rechargeable battery according to claim 1, further comprising two connection bosses on the bottom face of the case, the weld lines on the bottom face comprising four weld lines, one on each side of and adjacent each of the connection bosses.

8. The sealed rechargeable battery according to claim 1, further comprising two connection bosses on the sealing plate, the weld lines on the sealing plate comprising four weld lines, one on each side of and adjacent each of the connection bosses.

9. The sealed rechargeable battery according to claim 1, wherein the electrode plate group has an oval cross section, said weld lines crossing the longer side of the oval cross section.

10. The sealed rechargeable battery according to claim 1, wherein the metal case has an oval cross section, said weld lines crossing the longer side of the oval cross section.

11. The sealed rechargeable battery according to claim 1, wherein the positive electrode end face is connected by welding to the sealing plate and the negative electrode end face is connected by welding to the bottom face of the case.

12. The sealed rechargeable battery according to claim 1, wherein a central portion of the sealing plate includes a hole for injecting the electrolyte.

13. The sealed rechargeable battery according to claim 9, further comprising a vent assembly including a rubber vent for sealing the hole after injection of the electrolyte.

14. A sealed rechargeable battery comprising:
    a metal case having any of an oval cross section and a rectangular cross section;
    a metal sealing plate for sealing an open end of the case;
    an insulation gasket interposed between the case and the sealing plate; and
    an electrode plate group comprising a positive electrode plate and a negative electrode plate wound around with a separator interposed therebetween, core materials of the positive electrode plate and the negative electrode plate being protruded to opposite sides to form a positive electrode end face and a negative electrode end face at either end of the electrode plate group,
    the electrode plate group being accommodated in the case with liquid electrolyte with its winding axis vertical relative to the open end of the case,
    the positive electrode end face being directly connected to the sealing plate by welding,
    the negative electrode end face being directly connected to a bottom face of the case by welding,
    the electrode plate group having an oval cross section,
    the positive electrode end face and the negative electrode end face being welded along a plurality of weld lines extending perpendicular to a lengthwise direction of the oval,
    the plurality of weld lines comprising a straight line located in a central portion of the oval perpendicular to the lengthwise direction of the oval, one or more lines located at semi-circular portions at either end of the oval and extended radially, and a plurality of flat V-shaped lines in between the central portion and either end of the oval at substantially equally spaced locations.

* * * * *